United States Patent [19]
Burnside

[11] 3,942,605
[45] Mar. 9, 1976

[54] ANTI-THEFT REMOVABLE IGNITION COIL INSTALLATIONS

[76] Inventor: Ernest Burnside, 3843 Rohns, Detroit, Mich. 48214

[22] Filed: Oct. 3, 1974

[21] Appl. No.: 511,684

[52] U.S. Cl. ........ 180/114; 123/198 B; 307/10 AT; 340/63
[51] Int. Cl.² ...................................... B60R 25/04
[58] Field of Search ............... 180/114; 307/10 AT; 340/63, 64; 123/146.5 B, 198 B

[56] References Cited
UNITED STATES PATENTS

| | | | |
|---|---|---|---|
| 1,663,721 | 3/1928 | Murray | 180/114 X |
| 3,004,170 | 10/1961 | Greenspan | 307/10 AT |
| 3,222,534 | 12/1965 | Scott | 308/10 AT |

Primary Examiner—M. H. Wood, Jr.
Assistant Examiner—Milton L. Smith
Attorney, Agent, or Firm—Willis Bugbee

[57] ABSTRACT

A removable assembly including an ignition coil container is adapted to be positioned in a receptacle which is mounted upon the bulkhead or near the floor of the driver's compartment of an automobile. This receptacle at one end is provided with a head of insulating material containing peripheral circumferentially-spaced multiple terminal plugs which are connected to the various low tension cables of the automobile engine ignition system and also has a central terminal plug adapted to be connected to a high tension cable. Separably engageable with these terminal plugs are correspondingly-located terminal sockets from which internal connections are made with the removable ignition coil mounted in the container.

10 Claims, 3 Drawing Figures

ANTI-THEFT REMOVABLE IGNITION COIL INSTALLATIONS

Figure 1:
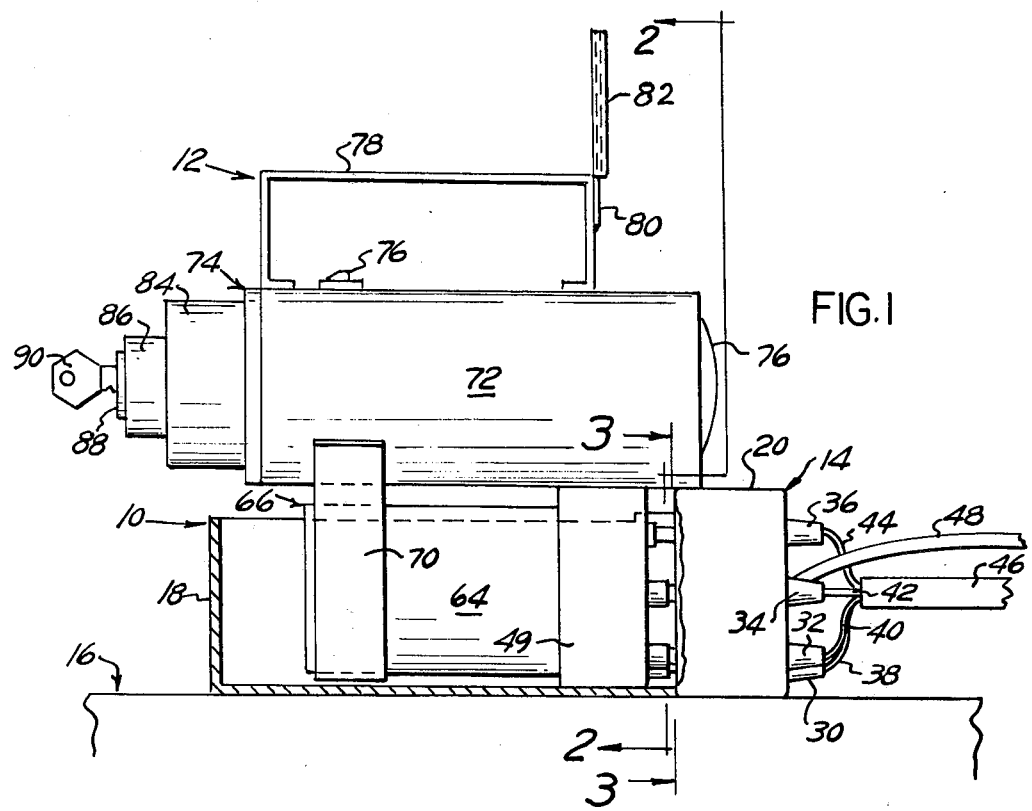
FIG. 1 is a side elevation, partly in section, of an anti-theft removable ignition coil installation, according to one form of the invention, shown in position diagrammatically on a support located in the driver's compartment of an automobile.
Figure 2:
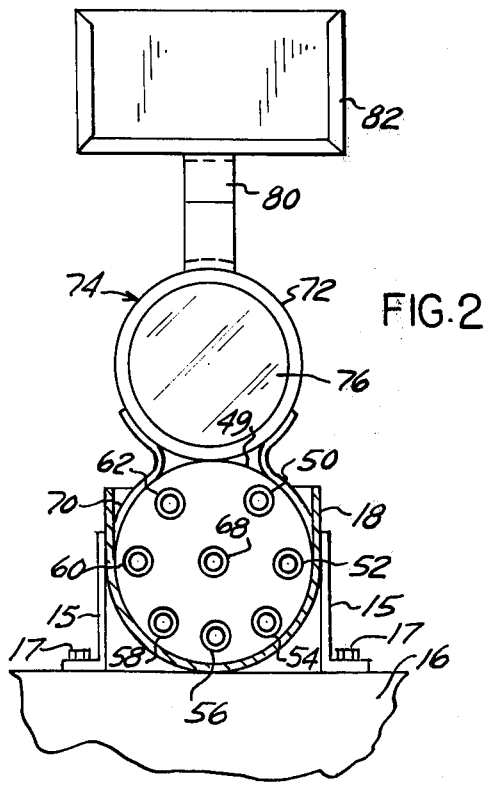
FIG. 2 is an elevation, partly in section, taken along the line 2—2 in FIG. 1.

Referring to the drawing in detail, FIG. 1 shows an anti-theft removable ignition coil installation, generally designated 10, according to one form of the invention as consisting generally of a removable assembly 12 and a stationary assembly 14, the latter being mounted on brackets 15 bolted at 17 (FIG. 2) to a support 16 located upon the bulkhead or near the floor of the driver's compartment of a conventional automobile equipped with a conventional electrical system (also not shown). The stationary assembly 14 includes an open-topped trough-shaped receptacle 18 having its forward end closed by the cylindrical head 20 of insulating material. The head 20 is provided with a central high-tension terminal plug 22 and circumferentially-spaced peripherally-located low tension terminal plugs 24, 26, 28, 30, 32, 34 and 36 spaced at irregular intervals individual for each automobile. The plug 24 is connected to the storage battery of the car, the plug 26 to the ignition timer-distributor, the plug 28 is connected to a ground, usually on the frame of the automobile, the plug 30 is connected to the starter system solenoid. The plug 32 is connected to electrical accessories, such as a radio set. The plug 34 is connected to the ignition system, and the plug 36 connects the car's storage battery to the low tension portion of the ignition system.

The peripheral plugs 24 to 36 are connected by conductors such as the wires 38, 40, 42 and 44 and other similar wires not shown in FIG. 1 for the remaining plugs 24, 26 and 28, these wires being received within and carried by a tubular conduit 46, which carries them to their respective destinations in the electrical system of the automobile. A high tension electric cable 48 leads from the central high tension plug 22 to the high tension portion of the ignition system of the automobile.

Mounted on a circular head 49 of insulating material on the forward end of the spark coil casing 64 and corresponding in location to and mating with the low tension terminal plugs 24 to 36 are low tension terminal sockets 50, 52, 54, 56, 58, 60 and 62 mounted on the forward end of the container 64 of the spark coil, generally designated 66, these being connected to the spark coil winding (not shown) and to other appropriate conductors (not shown) within the spark coil casing 64. Similarly, a central high tension terminal socket 68 is mounted in the center of the spark coil casing 64 and connected to the high tension output of the spark coil 66.

Secured to and rising from the rearward end of the spark coil casing 64 (FIGS. 1 and 2) is a C-shaped encircling bracket 70, the upper ends of which are secured as by welding to the cylindrical casing 72 of a conventional flashlight, generally designated 74, having at its forward end a removable lens 76 giving access to the flashlight casing interior (not shown in the drawing) containing the usual reflector, incandescent electric light bulb, battery and their connections to one another through a manual switch 76 mounted on the top of the flashlight casing 72. Welded to the latter are the lower ends of a horizontal rectangular carrying handle 78, to the forward end of which is secured the lower end of an upstanding bracket 80, to the upper end of which is secured a three-sided identification card or photograph holder 82. Extending rearwardly from the rearward end of the flashlight casing 72 is a cylindrical portion 84 from which in turn an ignition switch 86 projects. Mounted in the ignition switch 86 is an ignition switch lock 88 adapted to be operated by an ignition switch key 90.

In the use of the anti-theft removable ignition coil installation 10, let it be assumed that the parts described above are in the relative positions shown in FIGS. 1 and 2 and that the operator has parked his car and has shut off the engine by turning the key 90 in the ignition switch lock 88 of the ignition switch 86. To further protect his car positively against theft by the use of the present invention, he grasps the handle 78 and, in case of darkness, closes the flashlight switch 76 in order to illuminate the surroundings. The operator now pulls rearwardly (to the left in FIG. 1) upon the handle 78 so as to slide the assembly 12 backward to the left. The consequent rearward motion of the spark coil casing 64 and its head 49 withdraws the terminal sockets 50, 52, 54, 56, 58, 60, 62 and 68 from mating engagement with the corresponding terminal plugs 24, 26, 28, 30, 32, 34, 36 and 22 respectively, thereby breaking the connections and rendering the electrical operating circuitry of the automobile inoperative and de-energized. The operator then lifts the movable assembly 12 out of the receptacle 18 and out of the driver's compartment. He then carries away the removable assembly 12 with him as he leaves the automobile, thereby rendering the latter completely inoperative and incapable of the usual theft procedure of wiring around switches and other terminal points within the electrical system of the automobile.

Figure 3:
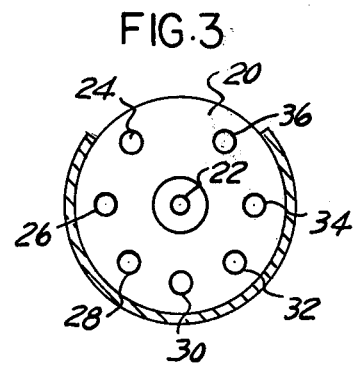
FIG. 3 is a cross-section taken along the line 3—3 in FIG. 1, looking in the opposite direction from FIG. 2.

When the operator returns to the automobile and desires to operate it, by means of the handle 78 he lowers the removable assembly 12 into the rearward end of the receptacle 18, assisting himself, if he so desires, by operating the flashlight switch 76 to illuminate the surroundings. He then pushes forward on the handle 78, while visually aligning the various terminal sockets 50 to 68 (FIG. 2) with their respective terminal plugs 22 to 36 (FIG. 3) so that they mate with one another (FIG. 1). By means of his key 90 he then actuates the ignition switch lock 88, thereby closing the ignition switch 86 and consequently starting the automobile engine in the usual way.

I claim:

1. An anti-theft ignition coil installation for temporarily removing and carrying away the ignition coil and thereby temporarily inactivating the electrical ignition system of the internal combustion engine of a conventional automobile having a body with a driver's compartment therein, said installation comprising a stationary assembly adapted to be mounted in the driver's compartment and including a receptacle having a wall with a stationary high tension terminal mounted in said wall and a multiplicity of stationary low-tension terminals stationarily mounted in said wall in insulated spaced relationship thereon and adapted to be permanently connected to the high tension and low tension circuits respectively of the electrical ignition system of the automobile engine, and a completely removable assembly movable toward and away from said receptacle into and out of coupling engagement with said stationary assembly and completely separable therefrom, said removable assembly including an ignition coil structure having conventional high tension and low tension secondary and primary windings respectively and also having a movable high tension terminal and a multiplicity of movable low tension terminals connected to said high tension and low tension windings respectively and mounted in said structure in the same spaced insulated relationship as their corresponding stationary high tension and low tension terminals respectively and movable into and out of mating engagement therewith and selectively completely removable from the automobile and replaceable therein in response to moving said removable assembly into and out of coupling engagement with said stationary assembly.

2. An anti-theft ignition coil installation, according to claim 1, wherein said receptacle has an access opening therein, and wherein said removable assembly is movable inward and outward and completely severable from said receptacle through said access opening during coupling and uncoupling thereof and completely severable from said stationary assembly and receptacle.

3. An anti-theft ignition coil installation, according to claim 1, wherein said receptacle is elongated, wherein said wall has an end portion, and wherein said terminals are mounted on said end portion.

4. An anti-theft ignition coil installation, according to claim 3, wherein said ignition coil structure is also elongated, and wherein said receptacle has a length sufficiently greater than said ignition coil structure to enable coupling and uncoupling of said assemblies.

5. An anti-theft ignition coil installation for selectively activating and inactivating the electrical ignition system of the internal combustion engine of a conventional automobile having a body with a driver's compartment therein, said installation comprising a stationary assembly adapted to be mounted in the driver's compartment and including a receptacle having a wall with a stationary high tension electrode mounted in said wall and a multiplicity of stationary low-tension electrodes stationarily mounted in said wall in insulated spaced relationship thereon and adapted to be permanently connected to the high tension and low tension circuits respectively of the electrical ignition system of the automobile engine, a movable assembly movable toward and away from said receptacle into and out of coupling engagement with said stationary assembly, said movable assembly including an ignition coil structure having conventional high tension and low tension secondary and primary windings respectively and also having a movable high tension electrode and a multiplicity of movable low tension electrodes connected to said high tension and low tension windings respectively and mounted in said structure in the same spaced insulated relationship as their corresponding stationary high tension and low tension electrodes respectively and movable into and out of mating engagement therewith in response to moving said movable assembly into and out of coupling engagement with said stationary assembly, and a flashlight mounted on said movable assembly and selectively operable for illuminating said stationary assembly during motion of said movable assembly toward said stationary assembly.

6. An anti-theft ignition coil installation, according to claim 5, wherein said ignition coil structure has a bracket mounted thereon and projecting upward therefrom, and wherein said flashlight is mounted on said bracket.

7. An anti-theft ignition coil installation, according to claim 6, wherein said flashlight and said ignition coil structure are mounted parallel to one another.

8. An anti-theft ignition coil installation, according to claim 5, wherein said removable assembly includes a carrying handle disposed adjacent said flashlight.

9. An anti-theft ignition coil installation, according to claim 8, wherein an identification card holder is mounted on said removable assembly.

10. An anti-theft ignition coil installation, according to claim 9, wherein said identification card holder is mounted on said handle of said removable assembly.

* * * * *